United States Patent
Bartonek et al.

(10) Patent No.: US 8,922,384 B2
(45) Date of Patent: Dec. 30, 2014

(54) AUTOMATED CALIBRATION METHOD FOR A DRAGGING EQUIPMENT DETECTOR

(71) Applicant: Progress Rail Services Corporation, Albertville, AL (US)

(72) Inventors: Mark Joseph Bartonek, Blue Springs, MO (US); Donald John Arndt, Napoleon, MO (US); Steven Conrad Hamerle, Richmond, MO (US)

(73) Assignee: Caterpillar Inc., Peoria, IL (US)

( * ) Notice: Subject to any disclaimer, the term of this patent is extended or adjusted under 35 U.S.C. 154(b) by 139 days.

(21) Appl. No.: 13/666,415

(22) Filed: Nov. 1, 2012

(65) Prior Publication Data

US 2014/0118152 A1 May 1, 2014

(51) Int. Cl.
*G08B 21/00* (2006.01)

(52) U.S. Cl.
USPC ......... 340/665; 340/933; 246/249; 246/473 R

(58) Field of Classification Search
USPC ........ 340/665, 686.1, 686.6, 933; 246/167 R, 246/169 R, 246, 249, 473 R, 122 R; 73/12.01, 12.09
See application file for complete search history.

(56) References Cited

U.S. PATENT DOCUMENTS

| | | | |
|---|---|---|---|
| 3,546,448 A | 12/1970 | Pelino | |
| 3,558,875 A | 1/1971 | Gieskieng | |
| 4,008,870 A * | 2/1977 | Gardner et al. | 246/120 |
| 6,412,332 B1 | 7/2002 | Bartonek | |
| 7,292,144 B2 | 11/2007 | Ballinger | |
| 7,328,871 B2 * | 2/2008 | Mace et al. | 246/169 R |
| 7,861,979 B2 | 1/2011 | Beaman | |
| 2006/0017583 A1 * | 1/2006 | Davenport et al. | 340/641 |
| 2006/0076461 A1 | 4/2006 | DeRose et al. | |

* cited by examiner

*Primary Examiner* — Hung T. Nguyen
(74) *Attorney, Agent, or Firm* — Finnegan, Henderson, Farabow, Garrett & Dunner LLP

(57) ABSTRACT

A method for calibrating a moving object impact detector is disclosed. A controller may receive input indicative of movement of an impact element from a first position to a second position. The controller may also receive an activation signal corresponding to the movement of the impact element. The controller may further receive input indicative of instructions to correlate the activation signal with the movement of the impact element. The controller may selectively set the activation signal as a reference signal for the detector, with the reference signal being indicative of an impact the moving object impact detector is set to detect.

20 Claims, 3 Drawing Sheets

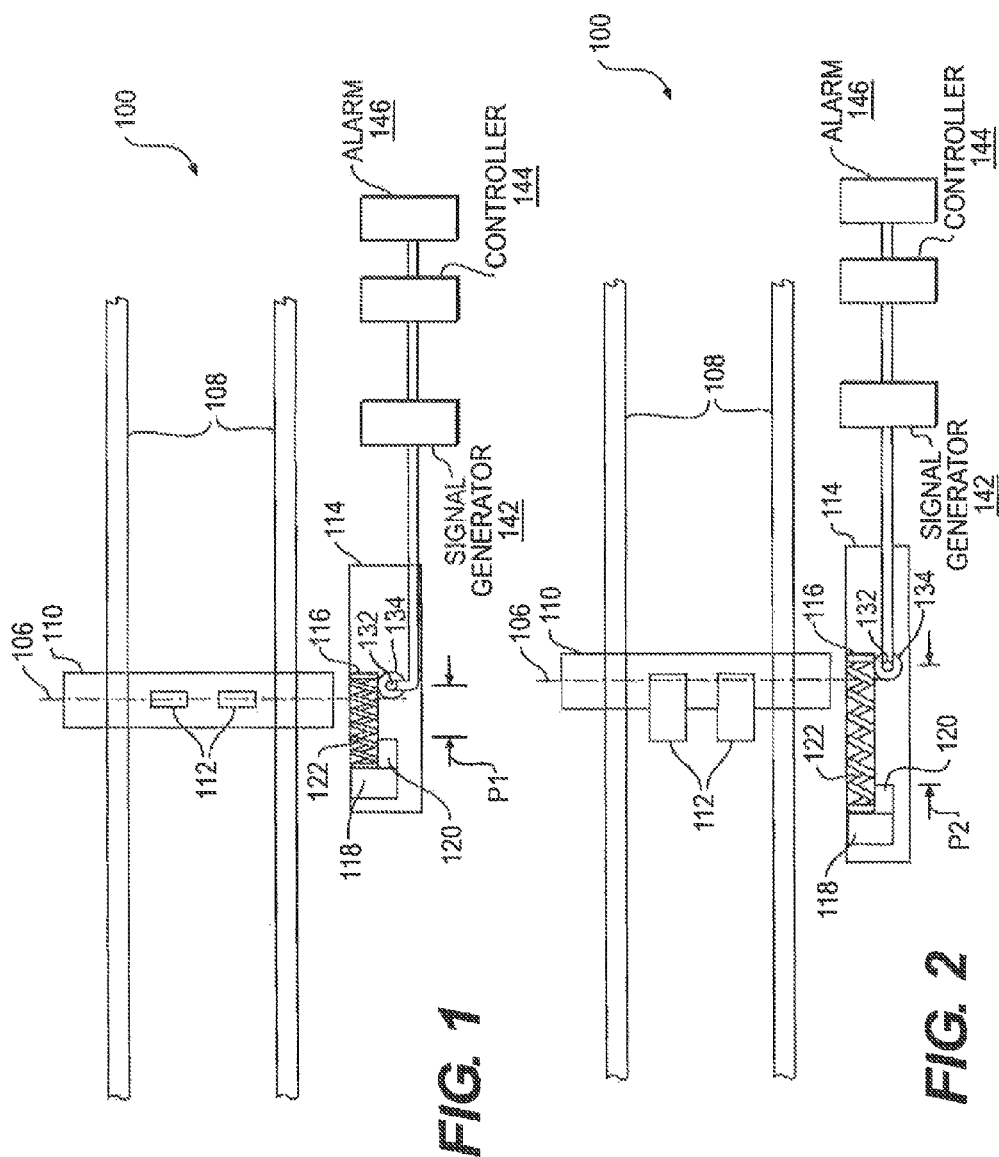

AUTOMATED CALIBRATION METHOD FOR A DRAGGING EQUIPMENT DETECTOR

TECHNICAL FIELD

The present disclosure relates generally to a calibration method and, more particularly, a method for calibrating a moving object impact detector.

BACKGROUND

Monitoring systems for the railroad industry provide methods and apparatus for detection of objects hanging from and dragging beneath a train as the train travels along rails of a railroad track. Dragging equipment detection systems are typically placed at twenty mile intervals over long stretches of a railroad track, in conjunction with other defect detection equipment. If a dragging object is detected, the train is stopped so that the object can be secured to reduce the potential for derailment or other problems.

One problem associated with existing dragging equipment detection systems involves the maintenance and adjustment required by the systems for continued proper operation. Existing systems include an impact element mounted on a shaft extending generally between the rails. The impact element includes at least one surface that is located and oriented to be impacted by an object hanging down from a passing train. Impact of an object against the impact element causes the shaft to rotate, and the rotational motion of the shaft is translated into linear motion used to actuate a switching mechanism and energize an alarm. The moving parts of the switching mechanism require lubrication and adjustment.

One attempt to reduce the amount of maintenance and adjustment of dragging equipment detection systems is disclosed in U.S. Pat. No. 7,292,144 of Ballinger that issued on Nov. 6, 2007 (the '144 patent). The '144 patent provides a contact-less switching mechanism wherein a magnetic amplifier and a magnet are moved relative to each other to generate an output signal indicative of an object impacting an impact element. The output signal is a function of variations in the impedance of a circuit connected to the magnetic amplifier caused by moving the magnetic field of the magnet closer to and farther away from the magnetic amplifier.

Although the dragging equipment detection system of the '144 patent may help to reduce the amount of maintenance required to keep the system and the switching mechanism working properly, it may be less than optimal. In particular, it may be necessary to undertake the time-consuming process of calibrating the detector by periodically adjusting the distance between the magnetic amplifier and the magnet to generate a desired output signal when the impact element has been moved a certain amount by an impact.

The system and method of the present disclosure solves one or more problems set forth above and/or other problems in the art.

SUMMARY

In one aspect, the present disclosure is directed to a method of calibrating a moving object impact detector. The method may include receiving input indicative of movement of an impact element from a first position to a second position. The method may also include receiving an activation signal corresponding to the movement of the impact element. The method may further include receiving input indicative of instructions to correlate the activation signal with the movement of the impact element. The method may still further include selectively setting the activation signal as a reference signal for the detector, with the reference signal being indicative of an impact the moving object impact detector is set to detect.

In another aspect, the present disclosure is directed to an apparatus for calibrating a moving object impact detector. The apparatus may include an activation signal generator configured to translate movement of an impact element from a first position to a second position into generation of an activation signal. The apparatus may also include a controller configured to selectively set the activation signal as a reference signal for the detector, the reference signal being indicative of an impact the moving object impact detector is set to detect.

BRIEF DESCRIPTION OF THE DRAWINGS

FIG. 1 is a schematic illustration of an exemplary disclosed detector;

FIG. 2 is a schematic illustration of the exemplary disclosed detector of FIG. 1 in an activated position;

DETAILED DESCRIPTION

Figure 3:
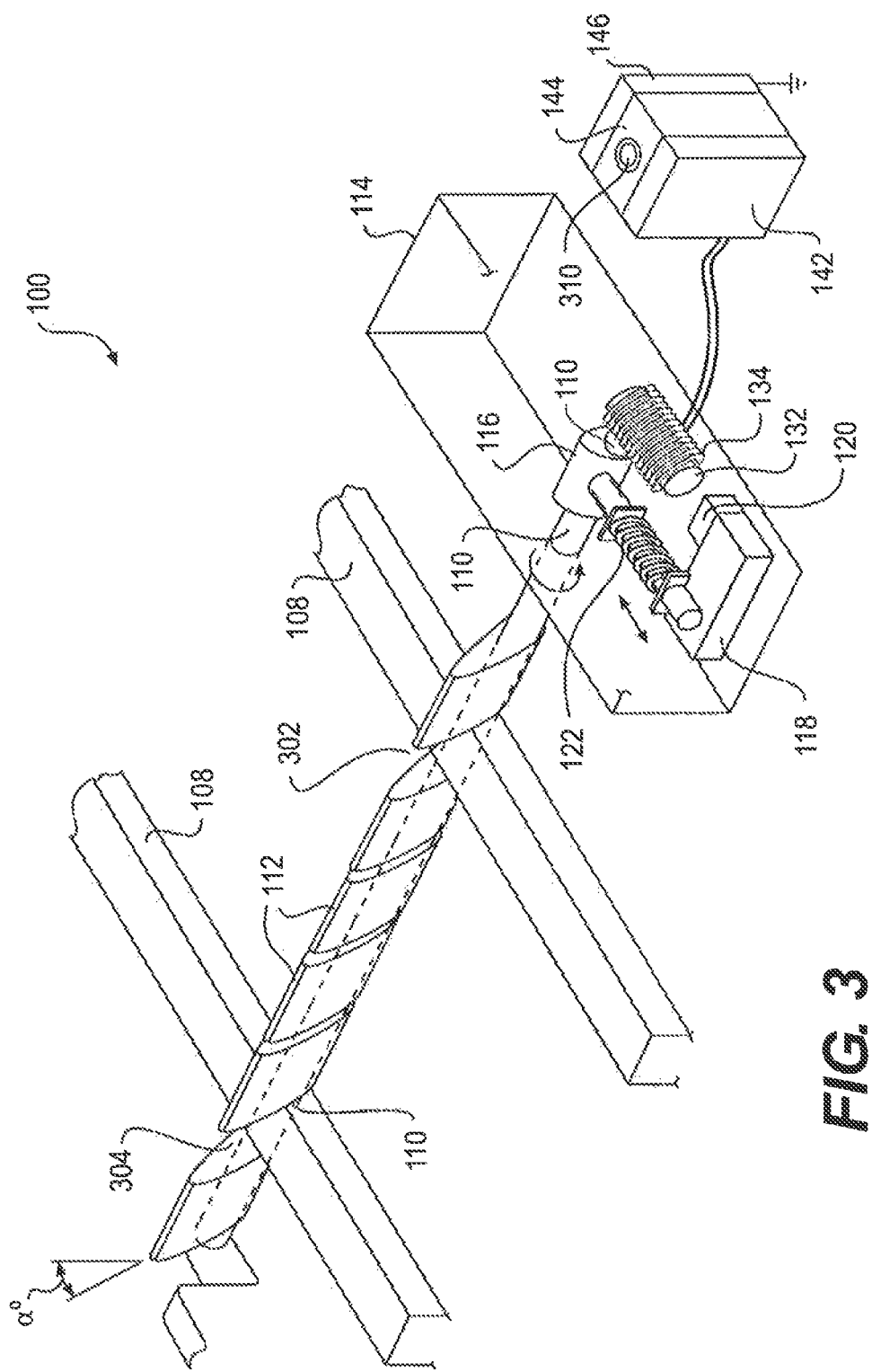
FIG. 3 is a diagrammatic illustration of the exemplary disclosed detector of FIGS. 1 and 2.

FIGS. 1, 2, and 3 illustrate an exemplary moving object impact detector 100 with automatic calibrating. Impact elements 112 may be fixedly mounted on a shaft 110. Shaft 110 may rotate about axis 106 when an impact element 112 is struck by an object below a train traveling along rails 108, or when a calibration is performed by rotating impact elements 112 and shaft 110 through a known triggering angle α. Shaft 110 and impact elements 112 may be normally biased into the position illustrated in FIG. 1, with impact elements 112 oriented in a generally vertical direction. Shaft 110 may be positioned in a direction generally perpendicular to a travel direction of the train along rails 108, and extend underneath rails 108. Impact elements 112 may be positioned between rails 108 and adjacent the outside of rails 108. Gaps 302, 304 may be formed between impact elements 112 to accommodate the width of each rail 108. Each impact element 112 may be formed or mounted with adjustable height so that a surface of each impact element 112 may project upward into the path of a moving object below a train traveling along rails 108.

As shown in FIG. 1, impact elements 112 may be normally biased into a substantially vertical position by a biasing mechanism or spring 122, a cam follower 118, and a cam 116 mounted at one axial end of shaft 110 within a housing 114. In the position shown in FIG. 1, spring 122 may bias cam follower 118 such that cam follower 118 may be in a normally biased position P1 closer to the axis 106 of shaft 110. In an actuated position P2 shown in FIGS. 2 and 3, impact elements 112 have been subjected to a triggering movement, and have been rotated through a triggering angle α to a position farther away from vertical than in their normally biased position P1. Impact elements 112 and shaft 110 may be rotated through a desired triggering angle α during a deliberate calibration operation, or as a result of an impact of an object against impact elements 112. One of ordinary skill in the art will recognize that the exemplary cam and cam follower mechanism contained within housing 114 may convert rotational motion of impact elements 112 and shaft 110 into linear displacement of cam follower 118. Alternative implementations may achieve a similar result using different cam 116 and cam follower 118 mechanisms with different curved surfaces acting as the cam 116, and different linearly displaceable structures acting as the cam follower 118. In one exemplary implementation, the triggering angle α through which impact elements 112 may be rotated may be within the range from approximately 15 degrees to approximately 30 degrees of rotation. One of ordinary skill in the art will recognize that this range may be varied, and in alternative implementations impact elements 112 may be rotated from a substantially vertical orientation through 90 degrees of rotation to a substantially horizontal orientation. Other alternative implementations may include impact elements 112 mounted in the path of an object beneath a train such that impact of the object against impact elements 112 may result in impact elements 112 moving along a linear path rather than rotating about axis 106 of shaft 110. One of ordinary skill in the art will recognize that the triggering movement of impact elements 112 may be determined by the structure of impact elements 112 and the way in which impact elements 112 are mounted or positioned in the path of a moving object. Although FIGS. 1-3 illustrate impact elements 112 mounted on shaft 110 for rotational motion about axis 106, alternative implementations may include impact elements mounted for linear displacement, or for other patterns of motion when impacted by an object beneath a train or otherwise subjected to movement for calibration purposes.

An activation signal generator 142 may be coupled to a circuit that includes a magnetic amplifier coil 134 wrapped around a magnetic amplifier core 132. Magnetic amplifier coil 134 and magnetic amplifier core 132 may be disposed in a fixed position within housing 114 mounted at one axial end of shaft 110. Cam 116 may also be disposed within housing 114 at the axial end of shaft 110, and configured to move cam follower 118 and a magnet 120 fixedly mounted on cam follower 118 closer toward and farther away from magnetic amplifier coil 134 when shaft 110 is rotated. One of ordinary skill in the art will recognize that alternative implementations to moveable magnet 120 may include mounting magnetic amplifier coil 134 and magnetic amplifier core 132 on cam follower 118 and moving magnetic amplifier coil 134 and magnetic amplifier core 132 relative to a fixedly mounted magnet 120. Activation signal generator 142 may be configured to generate and supply an alternating current (ac) voltage signal to the circuit that includes magnetic amplifier coil 134. Activation signal generator 142 may also be configured to translate movement of impact elements 112 into an activation signal. Activation signal generator 142 may be coupled to a controller 144.

Magnetic amplifier coil 134 may be responsive to the ac voltage signal generated by activation signal generator 142 and to the location of magnet 120 mounted on cam follower 118 to vary the impedance of the circuit. Magnetic amplifier coil 134 may operate as a magnetically variable inductor when the location of magnet 120 is changed relative to magnetic amplifier coil 134 to change the inductance of magnetic amplifier coil 134. When magnet 120 mounted on cam follower 118 is in normally biased position P1 substantially closer to magnetic amplifier core 132 of magnetic amplifier coil 134, the permeability of magnetic amplifier core 132 is saturated and the inductance of magnetic amplifier coil 134 is reduced. When magnet 120 is moved to actuated position P2, as shown in FIGS. 2 and 3, substantially farther away from magnetic amplifier core 132, the permeability of magnetic amplifier core 132 is increased and the inductance of magnetic amplifier coil 134 is increased. The change in inductance of magnetic amplifier coil 134 resulting from the change in position of magnet 120 corresponds to a change in impedance of the circuit including magnetic amplifier coil 134 and activation signal generator 142. Increased inductance in magnetic amplifier coil 134 and the resulting increased impedance of the circuit corresponds to less current flowing through the circuit. Decreased inductance in magnetic amplifier coil 134 and the resulting decreased impedance of the circuit corresponds to more current flowing through the circuit.

In the exemplary implementation illustrated in FIGS. 2 and 3, impact elements 112 have been moved from the substantially vertical position of FIG. 1 through a triggering angle α to a position where cam follower 118 has moved magnet 120 farther away from magnetic amplifier coil 134. Cam 116, cam follower 118, magnet 120, and magnetic amplifier coil 134 may operate as a contact-less switching mechanism that varies current flow in the circuit including magnetic amplifier coil 134 and activation signal generator 142. The result may be the generation of an activation signal that may be provided to controller 144. The activation signal may be an output voltage generated by the change in impedance of the circuit including magnetic amplifier coil 134 and activation signal generator 142.

Variations in the structure and relative orientation of cam 116, cam follower 118, magnet 120, magnetic amplifier core 132, and magnetic amplifier coil 134 contained within housing 114 may result in variations in the magnitude, amplitude, frequency, or other parameters of the activation signal generated by movement of magnet 120 relative to magnetic amplifier coil 134. These variations in the activation signal may occur gradually over time, and may be corrected for by periodic calibration of the detector. An exemplary detector calibration process may include moving impact elements 112 through a triggering angle α, such as from position P1 of FIG. 1 to position P2 of FIG. 2, and then setting the resulting activation signal as a reference signal using controller 144. Controller 144 may set the activation signal that is generated in the circuit as a result of the relative movement between magnet 120 and magnetic amplifier coil 134 as a reference signal associated with the triggering angle α through which impact elements 112 are moved. This process of setting the activation signal that is generated in the circuit as a reference signal may be performed automatically, or by receiving an input from an operator through an input mechanism, such as by pressing button 310 on controller 144.

Controller 144 may be configured to selectively set the activation signal received from activation signal generator 142 as a reference signal for detector 100, with the reference signal being indicative of an impact that detector 100 is set to detect. Controller 144 may also include a learning function configured to store a particular triggering angle α through which impact elements 112 are moved, and set the resulting activation signal received from activation signal generator 142 as the reference signal associated or correlated with that particular triggering angle α. The learning function may take any number of different variables into consideration, including train speed, stiffness of impact elements, strength of spring 122, ambient conditions, position along a train track, electrical characteristics of magnetic amplifier coil 134, magnetic field strength of magnet 120, and time or frequency of calibrations. The learning function may be performed automatically, or activated by manual manipulation of an input mechanism associated with controller 144, such as a button 310 provided on controller 144. In a manual implementation of a calibration procedure, impact elements 112 may be moved through a desired triggering angle α, and button 310 may be activated to set the resulting activation signal as a reference signal associated with the triggering angle α. In various implementations, controller 144 may be configured to set a plurality of different activation signals as a plurality of different reference signals correlated with a plurality of different triggering angles α. Controller 144 may further be configured to activate an alarm 146 when an activation signal is determined to be equal to or greater than the reference signal that has been set.

The disclosed method and apparatus may allow for the automatic calibration of moving object impact detector 100. Controller 144 may be configured to automatically implement a calibration process when impact elements 112 have been moved from normally biased position P1, shown in FIG. 1, to actuated position P2, shown in FIGS. 2 and 3. Controller 144 may also be configured to implement the automatic calibration procedures on a periodic basis determined by factors that may include elapsed time since last calibration, frequency of impacts, magnitude of impacts, weather conditions, and location of detector 100 along the train track. The amount of movement between normally biased position P1 and actuated position P2 may vary based on a number of different parameters that may include the type of object striking impact elements 112, a stiffness of spring 122, structure and mass of impact elements 112, position of impact elements relative to rails 108, and location of detector 100 along rails 108. During an automatic calibration process, controller 144 may receive a signal indicative of the movement of impact elements 112 through a triggering angle α and set the generated activation signal as a reference signal associated or correlated with the triggering angle α.

One of ordinary skill in the art will recognize that although activation signal generator 142, controller 144, and alarm 146 are illustrated as separate units, the functionality provided by each of these elements could be provided instead by one or more processors. The one or more processors may be part of a server, client, network infrastructure, mobile computing platform, or a stationary computing platform, one or more of which may be contained in a dispatch office, on the train, in a single wayside housing, multiple wayside housings, or at remote locations communicatively coupled over wired or wireless networks.

INDUSTRIAL APPLICABILITY

The disclosed exemplary method for calibrating as moving object impact detector 100 may avoid having to make physical adjustments to moving object impact detector 100 to maintain moving object impact detector 100 in proper working order. The activation signal generated by moving object impact detector 100 may vary over time as a result of wear on components from continued use, changes in the relative orientations of various components from vibrations and shocks that may occur during use, and other factors that may include environmental conditions. If a particular activation signal is expected as an output associated with a certain movement of an impact element, calibration of the moving object impact detector to achieve that particular activation signal may require making time consuming and expensive adjustments to the orientation and spacing between the magnet 120 and magnetic amplifier coil 134. In accordance with various implementations of the present disclosure, these physical adjustments are avoided.

Figure 4:
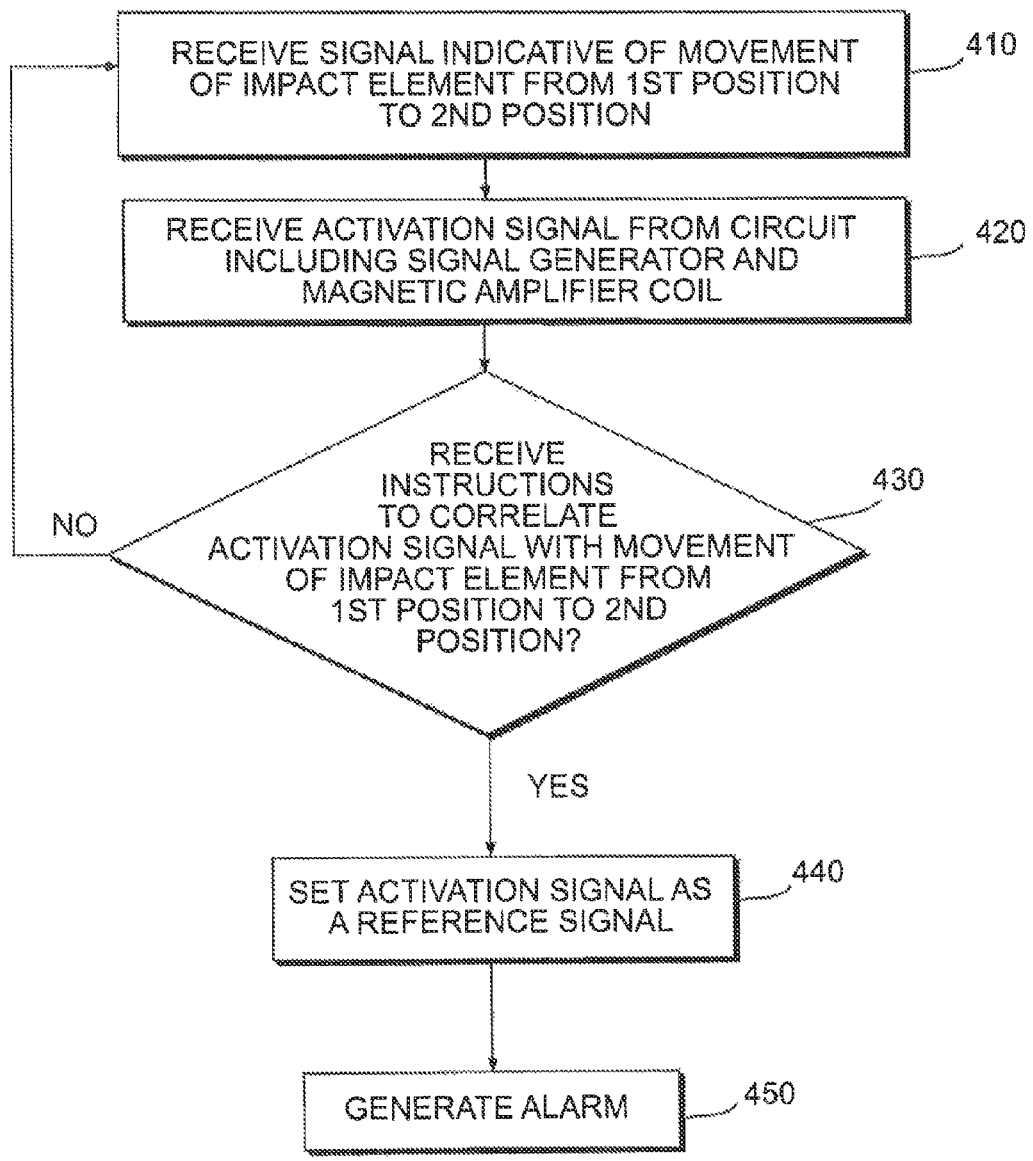
FIG. 4 is a flowchart depicting an exemplary disclosed calibration method that may be performed by the detector of FIGS. 1, 2, and 3.

As shown in FIG. 4, at step 410 controller 144 may receive a signal indicative of the movement of impact element 112 from a first position to a second position (step 410). The amount of movement of impact element 112 may be determined as representative of an amount of movement expected or anticipated when an object strikes impact element 112. Alternatively, the amount of movement of impact element 112 may be chosen during a calibration procedure as an amount sufficient to result in generation of a desired activation signal in the circuit including activation signal generator 142 and magnetic amplifier coil 134. A "manual calibration" includes the use of mechanical or other devices that may be used to provide a mechanical advantage to actually move impact elements 112 against a biasing mechanism such as spring 122 and cam 116. Variables such as the stiffness of spring 122, the thickness, rigidity, or other characteristics of the materials used to construct impact elements 112, or the location of impact elements 112 along rails 108 may be taken into consideration in determining how much movement of impact elements 112 should be performed in a calibration process. Alternatively, in an automatic calibration of moving object impact detector 100 during movement of the train, controller 144 may receive a signal indicative of movement of impact element 112 caused by an actual impact with an object below the moving train.

As shown in FIG. 4, at step 420 controller 144 may receive an activation signal from the circuit including magnetic amplifier coil 134 and signal generator 142. The activation signal may be generated, as described above, by changes in the impedance of the circuit including magnetic amplifier coil 134 and activation signal generator 142 caused by movement between magnet 120 and magnetic amplifier coil 134.

As further shown in FIG. 4, at step 430 controller 144 may determine whether input has been received indicative of instructions to correlate the activation signal with the movement of impact elements 112. As discussed above, the instructions received by controller 144 may be the result of a learning function that may be performed automatically, or by manual activation of an input mechanism associated with controller 144, such as a button 310 provided on controller 144. In a manual implementation of a calibration procedure, impact elements 112 may be moved through a desired triggering angle α, and button 310 may be activated by an operator.

As shown at step 440 in FIG. 4, a determination by controller 144 that input has been received indicative of instructions to correlate the activation signal with the movement of impact elements 112 (STEP 430: yes) may result in controller 144 setting the activation signal as a reference signal associated with the movement of impact elements 112. In this way controller 144 may perform a calibration of moving object impact detector 100 by receiving input indicative of instructions to learn the movement of impact elements 112, correlate that movement of impact elements 112 with the activation signal actually received, and set that activation signal as a reference signal corresponding to the movement of impact elements 112. In various alternative implementations, controller 144 may store one or more activation signals as corresponding reference signals that have been correlated with a plurality of different movements of impact elements 112. Controller 144 may also be configured to set the activation signal as a reference signal when the movement of impact element 112 from the first position to the second position is equal to or greater than a known triggering movement.

If controller 144 has not received input indicative of instructions to correlate the activation signal with the movement of impact elements 112 (STEP 430: no) the calibration process may return to step 410 to again receive a signal indicative of movement of impact element 112 from a first position to a second position. As further shown at step 450 in FIG. 4, controller 144 may send a signal to generate an alarm 146 when an activation signal has been set as a reference signal. In alternative implementations controller 144 may activate alarm 146 when movement of impact element 112 from a first position to a second position corresponds with generation of an activation signal equal to or greater than the reference signal.

It will be apparent to those skilled in the art that various modifications and variations can be made to the disclosed calibration method for a moving object impact detector without departing from the scope of the disclosure. Other embodiments of the calibration method will be apparent to those skilled in the art from consideration of the specification and practice of the calibration method disclosed herein. It is intended that the specification and examples be considered as exemplary only, with a true scope of the disclosure being indicated by the following claims and their equivalents.

What is claimed is:

1. A method of calibrating a moving object impact detector, the method being executed by a controller, the method comprising:
   receiving input indicative of movement of an impact element from a first position to a second position;
   receiving an activation signal corresponding to the movement of the impact element;
   receiving input indicative of instructions to correlate the activation signal with the movement of the impact element; and
   selectively setting the activation signal as a reference signal for the detector, wherein the reference signal is indicative of an impact the moving object impact detector is set to detect.

2. The method of claim 1, wherein the activation signal is set as a reference signal when the impact element is moved rotationally through a known triggering angle.

3. The method of claim 2, wherein the known triggering angle is within a range from approximately 15 degrees to approximately 30 degrees of rotation of the impact element.

4. The method of claim 1, further including activating an alarm when the impact element has been moved from the first position to the second position by impact with a moving object.

5. The method of claim 1, wherein:
   the movement of the impact element includes rotational movement; and
   the activation signal is generated by converting the rotational movement of the impact element into linear motion of a switching mechanism.

6. The method of claim 5, wherein the rotational movement is converted into linear motion using a cam and cam follower.

7. The method of claim 1, wherein the activation signal is generated by moving a magnet relative to a magnetic amplifier coil.

8. The method of claim 1, wherein selectively setting the activation signal as the reference signal for the detector includes storing the activation signal in association with the movement of the impact element from the first position to the second position.

9. The method of claim 1, wherein the activation signal is an output voltage generated by a change in impedance of a circuit caused by the movement of the impact element from the first position to the second position.

10. An apparatus for calibrating a moving object impact detector, the apparatus comprising:
    an activation signal generator configured to translate movement of an impact element from a first position to a second position into generation of an activation signal; and
    a controller configured to selectively set the activation signal as a reference signal for the detector, the reference signal being indicative of an impact the moving object impact detector is set to detect.

11. The apparatus of claim 10, wherein the controller includes a learning function configured to determine when the controller sets the activation signal as the reference signal.

12. The apparatus of claim 11, further including a manual input mechanism, wherein the learning function of the controller is activated by manipulation of the manual input mechanism.

13. The apparatus of claim 10, wherein the controller is further configured to set the activation signal as a reference signal when the movement of the impact element from the first position to the second position is equal to or greater than a known triggering movement.

14. The apparatus of claim 13, wherein the known triggering movement is a movement of the impact element through a triggering angle of approximately 15 degrees to approximately 30 degrees of rotation of the impact element.

15. The apparatus of claim 10, wherein the activation signal is one of a plurality of different activation signals generated by a plurality of different movements of the impact element.

16. The apparatus of claim 10, further including an alarm, wherein the controller is further configured to activate the alarm when the movement of the impact element from the first position to the second position corresponds with generation of an activation signal equal to or greater than the reference signal.

17. The apparatus of claim 10, further including a switching mechanism, wherein the activation signal generator is configured to translate the movement of the impact element into generation of the activation signal by converting rotational movement of the impact element into linear motion of the switching mechanism.

18. The apparatus of claim 17, wherein the switching mechanism includes a moveable magnet and a fixed position magnetic amplifier coil, and the movement of the impact element from the first position to the second position translates into a movement of the magnet relative to the magnetic amplifier coil.

19. The apparatus of claim 10, further including an alarm, wherein the controller is further configured to activate the alarm when the controller sets the activation signal as the reference signal.

20. A method of calibrating a moving object impact detector, the method being executed by a controller, the method comprising:
    receiving input indicative of movement of an impact element positioned in a path of the moving object from a first position to a second position;
    receiving an activation signal corresponding to the movement of the impact element;
    selectively setting the activation signal as a reference signal for the detector associated with the movement of the impact element, wherein the reference signal is indicative of an impact the moving object impact detector is set to detect; and
    activating an alarm when the impact element has been moved from the first position to the second position.

* * * * *